(12) United States Patent
Amend

(10) Patent No.: US 12,184,537 B2
(45) Date of Patent: Dec. 31, 2024

(54) METHOD AND NETWORK DEVICE FOR MULTI-PATH COMMUNICATION

(71) Applicant: Deutsche Telekom AG, Bonn (DE)

(72) Inventor: Markus Amend, Nidda (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/774,152

(22) PCT Filed: Nov. 3, 2020

(86) PCT No.: PCT/EP2020/080829
§ 371 (c)(1),
(2) Date: May 4, 2022

(87) PCT Pub. No.: WO2021/089552
PCT Pub. Date: May 14, 2021

(65) Prior Publication Data
US 2022/0407799 A1 Dec. 22, 2022

(30) Foreign Application Priority Data

Nov. 6, 2019 (EP) .................................... 19207381

(51) Int. Cl.
*H04L 12/46* (2006.01)
*H04L 45/12* (2022.01)
(Continued)

(52) U.S. Cl.
CPC .......... *H04L 45/24* (2013.01); *H04L 12/4633* (2013.01); *H04L 45/123* (2013.01); *H04L 47/122* (2013.01)

(58) Field of Classification Search
CPC ............. H04L 12/66; H04L 43/08–106; H04L 47/10–125; H04L 12/4633
See application file for complete search history.

(56) References Cited

U.S. PATENT DOCUMENTS 10,581,749 B2 * 3/2020 Kumar ................ H04L 12/4633
10,594,618 B1 * 3/2020 Singh .................... H04L 47/365
(Continued)

FOREIGN PATENT DOCUMENTS

CN 107786307 A 3/2018
CN 109314662 A 2/2019
(Continued)

OTHER PUBLICATIONS

Iyengar et al., "QUIC Loss Detection and Congestion Control", IETF (Year: 2018).*
(Continued)

*Primary Examiner* — Boris D Grijalva Lobos
(74) *Attorney, Agent, or Firm* — LEYDIG, VOIT & MAYER, LTD.

(57) ABSTRACT

A method for transmitting data packets of at least one communication service from a first network entity to at least one destination network entity includes: establishing a quick user datagram protocol internet connection tunnel between the first network entity and a second network entity; transmitting the data packets from the first network entity to the second network entity via the quick user datagram protocol internet connection tunnel, wherein the data packets are encapsulated within quick user datagram protocol internet connection packets, and wherein the quick user datagram protocol internet connection packets are transmitted from the first network entity to the second network entity via multiple paths; extracting the data packets from the received quick user datagram protocol internet connection packets in the second network entity; and forwarding the extracted data packets from the second network entity to a respective destination network entity.

14 Claims, 3 Drawing Sheets

(51) Int. Cl.
    *H04L 45/24*     (2022.01)
    *H04L 47/122*     (2022.01)

(56) References Cited

U.S. PATENT DOCUMENTS

| | | | | |
|---|---|---|---|---|
| 2002/0054578 | A1* | 5/2002 | Zhang | H04N 21/6375 370/335 |
| 2015/0127853 | A1* | 5/2015 | Roskind | H04L 61/2503 709/245 |
| 2018/0041613 | A1 | 2/2018 | Lapidous et al. | |
| 2019/0104207 | A1* | 4/2019 | Goel | H04L 45/64 |
| 2019/0155645 | A1* | 5/2019 | Browne | G06F 9/4881 |
| 2019/0182165 | A1 | 6/2019 | Yang et al. | |
| 2019/0268797 | A1 | 8/2019 | Pang et al. | |
| 2020/0008248 | A1* | 1/2020 | Beck | H04W 76/15 |
| 2020/0036796 | A1* | 1/2020 | Tollet | H04L 12/4633 |
| 2020/0359264 | A1* | 11/2020 | Rácz | H04W 76/16 |
| 2020/0413466 | A1 | 12/2020 | Yu | |
| 2022/0166832 | A1* | 5/2022 | Belkar | H04L 67/1097 |

FOREIGN PATENT DOCUMENTS

| | | | |
|---|---|---|---|
| CN | 109328450 | A | 2/2019 |
| CN | 110366271 | A | 10/2019 |
| EP | 3531637 | A1 | 8/2019 |
| JP | 2019103118 | A | 6/2019 |

OTHER PUBLICATIONS

Tiesel et al., "Considerations for Unreliable Streams in QUIC", QUIC Working Group (Year: 2018).*

Indika, "Difference Between Encapsulation and Tunneling", differencebetween.com (Year: 2011).*

3GPP TR 23.793 V1.2.0, 3rd Generation Partnership Project; Technical Specification Group Services and System Aspects; Study on Access Traffic Steering, Switching and Splitting support in the 5G system architecture (Rel. 16) (Year: 2018).*

Piraux et al., "Tunneling Internet Protocol inside QUIC—draft-piraux-quic-tunnel-00", QUIC Working Group (Year: 2019).*

Cui Yong et al. "Innovating Transport with QUIC: Design Approaches and Research Challenges," IEEE Internet Computing, Institute of Electrical and Electronics Engineers, US, vol. 21, No. 2, Mar. 1, 2017, pp. 72-76, XP011641977.

Morgensen, Suhr Rasmus et al. "Reliability enhancement for LTE using MPQUIC in a mixed traffic scenario: A novel MPQUIC Selective Redundant Scheduling implementation," Jun. 7, 2018, pp. 1-108, XP055693315, Aalborg University, Denmark.

Abdelsalam, A. et al. "QUIC-proxy based architecture for satellite communication to enhance a 5G scenario," 2019 International Symposium on Networks, Computers and Communications (ISNCC), IEEE, US, Jun. 18, 2019, pp. 1-6, XP033663148.

Quentin De Coninck and Oliver Bonaventure, "Multipath QUIC: Design and Evaluation," Proceedings of the 13*th* International Conference on Emerging Networking Experiments and Technologies, CoNEXT '17, Dec. 12-15, 2017, Republic of Korea, pp. 160-166, XP055671532.

* cited by examiner

METHOD AND NETWORK DEVICE FOR MULTI-PATH COMMUNICATION

CROSS-REFERENCE TO PRIOR APPLICATIONS

This application is a U.S. National Phase application under 35 U.S.C. § 371 of International Application No. PCT/EP2020/080829, filed on Nov. 3, 2020, and claims benefit to European Patent Application No. EP 19207381.5, filed on Nov. 6, 2019. The International Application was published in English on May 14, 2021 as WO 2021/089552 A1 under PCT Article 21(2).

TECHNICAL FIELD

The invention relates to a method for transmitting data packets of at least one communication service from a first network entity to at least one destination network entity via multiple paths.

BACKGROUND

A Hybrid Access Network is a special architecture for broadband access networks where two different network technologies are combined, for instance combining one xDSL network with a wireless network such as LTE. Similarly, 3GPP ATSSS (3rd Generation Partnership Project Access Traffic Steering, Switching and Splitting) refers to an architecture in which 3GPP and non-3GPP accesses are combined. Access Traffic Steering refers to a procedure that selects an access network for a new data flow and transfers the traffic of this data flow over the selected access network, Access Traffic Switching refers to a procedure that moves all traffic of an ongoing data flow from one access network to another access network in a way that maintains the continuity of the data flow, and Access Traffic Splitting refers to a procedure that splits the traffic of a data flow across multiple access networks, wherein when traffic splitting is applied to a data flow, some traffic of the data flow is transferred via one access and some other traffic of the same data flow is transferred via another access. Access Traffic Steering, Switching and Splitting is applicable between 3GPP and non-3GPP accesses. Devices which are connectable to more than one network are also referred to as multi-homed devices.

For the purpose of simultaneously using multiple paths between peers, there exist several multipath network protocols like MPTCP (Multipath Transmission Control Protocol) standardized by IETF in RFC 6824, January 2013, CMT-SCTP described by P. Amer et al. in the document "Load Sharing for the Stream Control Transmission Protocol (SCTP), draft-tuexen-tsvwg-sctp-multipath-18, Jul. 22, 2019" and MP-DCCP as disclosed in the document "DCCP Extensions for Multipath Operation with Multiple Addresses, draft-amend-tsvwg-multipath-dccp-02" by M. Amend et al., Jul. 8, 2019.

In order to overcome TCP and HTTP limitations, the so-called QUIC protocol, its name "QUIC" originally proposed as the acronym for "Quick UDP Internet Connections", was initiated in 2013. An earlier effort in that context was the so-called SPDY. The decision not to evolve TCP itself was made because of backwards compatibility reasons and the slow penetrations and deployments of such evolvements. QUIC is running over UDP and promises performance benefits over TCP, even though it imitates a lot of its characteristics like congestion control and reliable in-order delivery. However, it extends the scope over TCP when including stream multiplexing and end-to-end encryption. In 2018 the decision was made that the next HTTP version HTTP/3 will run over QUIC. QUIC needs, like other transport protocols also, explicit implementation and selection by services.

The QUIC protocol thus is a general-purpose transport layer network protocol, which presently is in the process of standardization within the IETF. The current status of standardization by the IETF Working Group is described in the Internet draft "QUIC: A UDP-Based Multiplexed and Secure Transport, draft-ietf-quic-transport-23" by J. Iyengar et al., Sep. 12, 2019. In the following, the content of said Internet draft is also referred to as the current QUIC design. Non-standardized versions of QUIC are already in use and are for instance implemented in certain web browsers.

SUMMARY

In an exemplary embodiment, the present invention provides a method for transmitting data packets of at least one communication service from a first network entity to at least one destination network entity. The method includes: establishing a quick user datagram protocol internet connection tunnel between the first network entity and a second network entity; transmitting the data packets from the first network entity to the second network entity via the quick user datagram protocol internet connection tunnel, wherein the data packets are encapsulated within quick user datagram protocol internet connection packets, and wherein the quick user datagram protocol internet connection packets are transmitted from the first network entity to the second network entity via multiple paths; extracting the data packets from the received quick user datagram protocol internet connection packets in the second network entity; and forwarding the extracted data packets from the second network entity to a respective destination network entity.

BRIEF DESCRIPTION OF THE FIGURES

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Exemplary embodiments of the present invention provide a way for data packets of at least one communication service to be transmitted from a first network entity to at least one destination network entity via multiple paths using a QUIC protocol.

In the context of the present invention, the term QUIC shall encompass, unless otherwise stated, a protocol having the features according to the current status of standardization of the QUIC protocol by the IETF or a protocol according to a future standard of the QUIC protocol. Since the invention provides certain extensions and/or amendments of the QUIC protocol, however, in the context of the present invention the term QUIC shall not be limited to the current status of standardization of the QUIC protocol by the IETF, but shall also encompass these extensions and/or amendments, in particular with regard to the establishing of a tunnel and the employment of MP-QUIC and in certain embodiments also with regard to the utilization of non-reliable data transmission.

According to an embodiment of the present invention, between a first network entity and a second network entity a QUIC tunnel is established and for the data transmission between the first and second network entity a Multi-Path QUIC (MP-QUIC) protocol is used. A preferred aspect of the invention further lies in the utilization of non-reliable data transmission between the first network entity and the second network entity.

Figure 1:
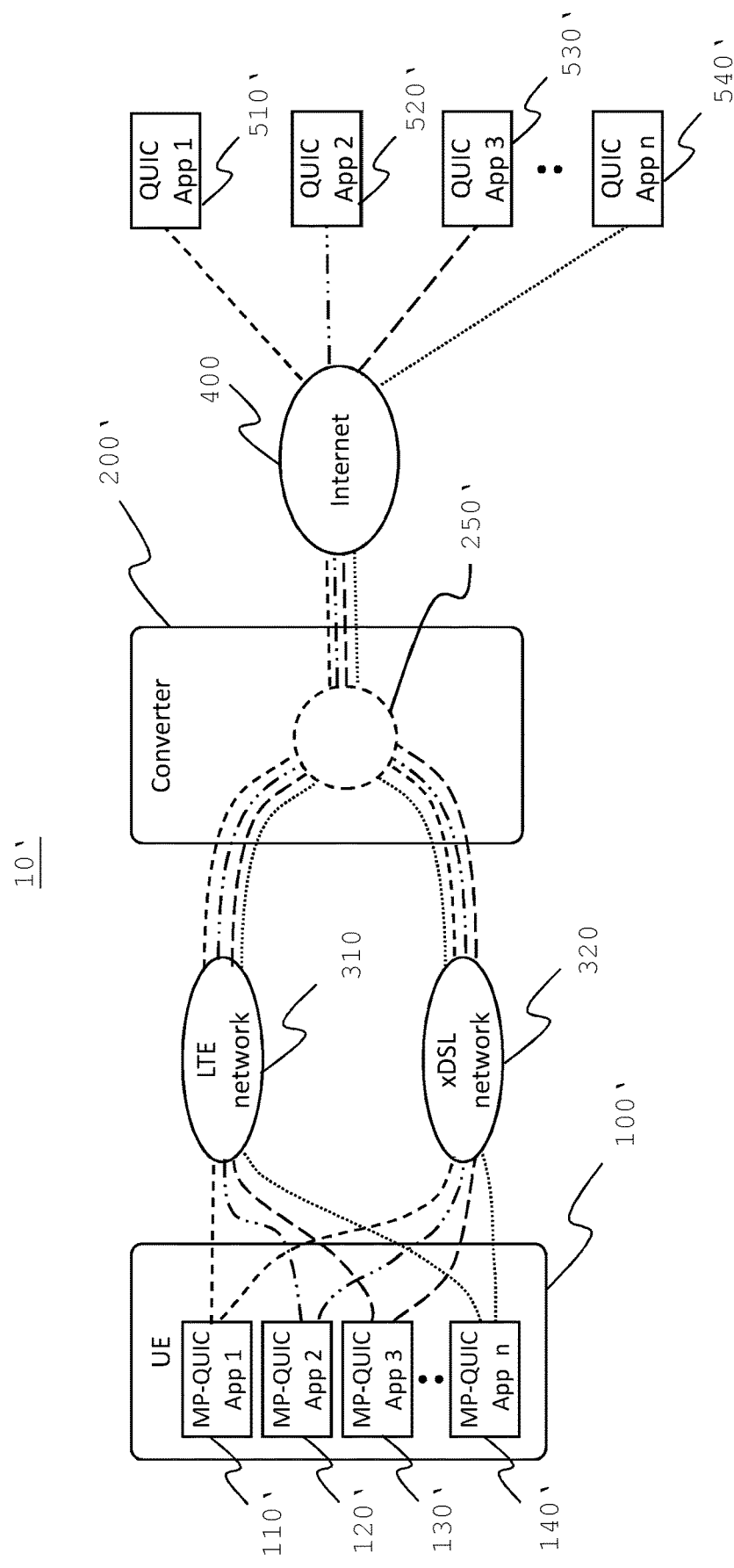
FIG. 1 depicts a schematic view of a non-working communication system illustrating a problem which is solved by the invention.

In FIG. 1 a non-working system architecture is shown for illustrating a problem which is encountered when the QUIC protocol shall be utilized via multiple paths, for instance in a hybrid access network or in the context of 3GPP ATSSS. In the theoretical, non-working communication system 10' shown in FIG. 1 a user equipment 100' is simultaneously connected to a converter server 200' via an LTE network 310 and an xDSL network 320. The user equipment 100' could be a hybrid customer premises equipment router and the converter 200' could be a hybrid aggregation gateway in a server of a communication provider.

Since QUIC and TCP share a lot of similarities regarding their transport characteristics, the experience with the MP-TCP protocol could be used and transferred to a MP-QUIC protocol. An MP-QUIC protocol which is comparable to MP-TCP can split QUIC connections over multiple paths and relies on QUIC's reliable in-order delivery.

In the system 10' applications 110', 120', 130' and 140' indicating a number of n applications running on the user equipment 100' shall use such MP-QUIC protocol for transmitting data packets via multiple paths, i.e. via networks 310 and 320, to the converter 200'. The converter 200' shall then forward the received data packets via the Internet 400 to respective destination applications 510', 520', 530' and 540' indicating a number of n destination applications, which use the QUIC protocol and which might be running on various devices or servers.

However, an MP-QUIC protocol which is comparable to MP-TCP can only work end-to-end and does not tolerate an interception, because of its inherent end-to-end encryption. Therefore, a proxy 250' which would be needed to translate the MP-QUIC protocol into the QUIC protocol cannot be realized and accordingly the communication system 10' as shown in FIG. 1 is a non-working system illustrating a general problem which is encountered when trying to utilized the QUIC protocol via multiple paths. As a result, inclusion into Hybrid Access or 3GPP ATSSS for operator controlled traffic management does not work on a QUIC or MP-QUIC protocol level.

Figure 2:
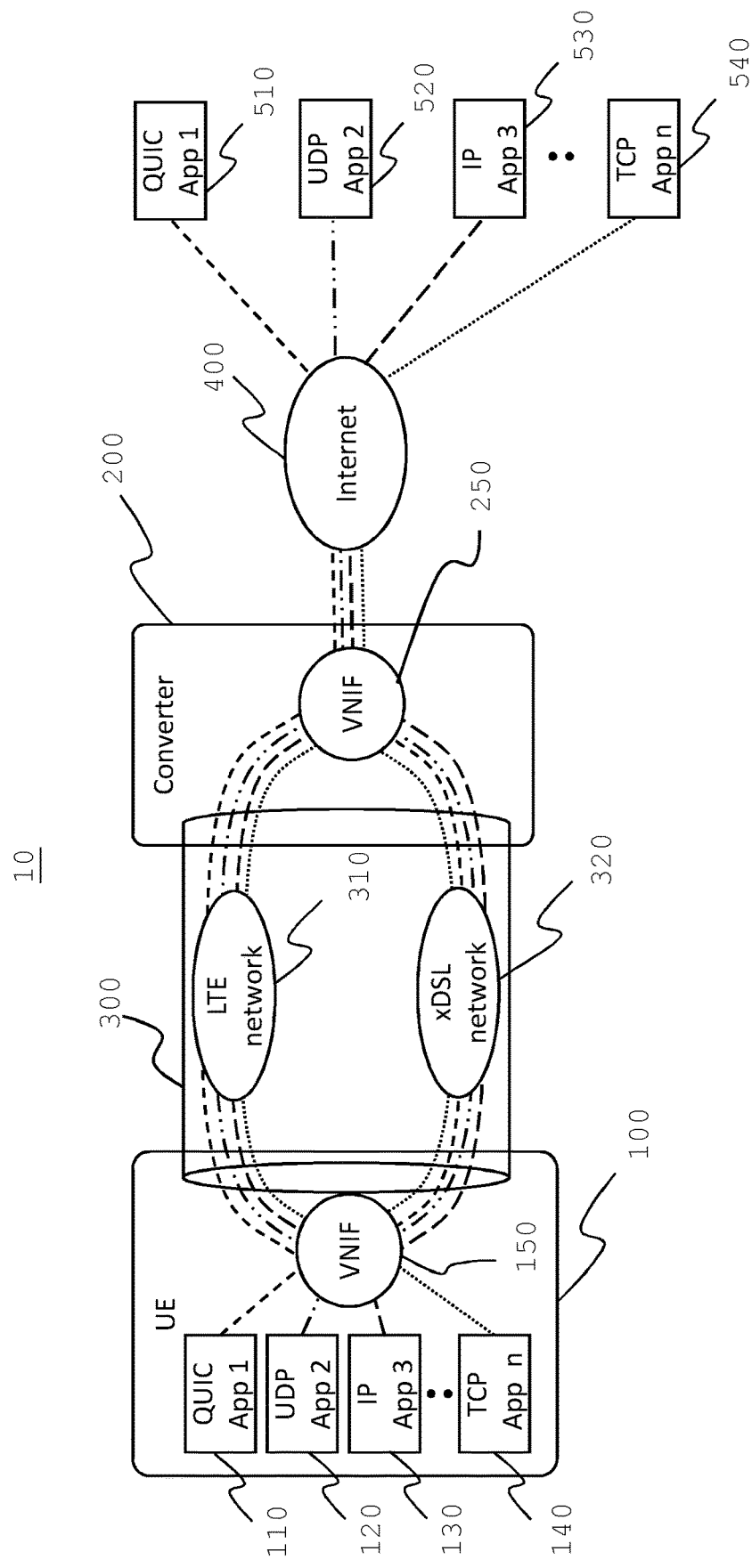
FIG. 2 depicts a schematic view of a communication system according to an embodiment of the invention.

In FIG. 2 a schematic view of a preferred embodiment of a communication system 10 according to the invention is shown, in which the above described problem is solved.

The communication system 10 comprises user equipment 100, wherein in a number of n applications communication services are running which respectively generate data packets which are to be transmitted to a respective destination network entity. The data packets are generated on the basis of a communication protocol which is selected depending on the respective communication service. In the embodiment shown in FIG. 2, a first application 110 is generating QUIC data packets, a second application 120 is generating UDP data packets, a third application 130 is generating IP data packets, and an nth application 140 is generating TCP data packets. In the shown embodiment, the different data packets from the different application are routed to a virtual network interface VNIF 150 which may be implemented in a hybrid customer premises equipment router. The applications 110, 120, 130 and 140 may be running on said router or on any kind of terminal device which is connected to the router, wherein such terminal device may be a mobile phone, a personal computer, a tablet PC, a smart TV set, or the like.

In the shown embodiment the virtual network interface 150 is connected to a virtual network interface 250 in a converter 200, wherein said converter 200 preferably is a hybrid aggregation gateway in a server of a communication provider. The hybrid user equipment 100 and the hybrid converter 200 are simultaneously connected via at least two different networks, thus enabling data transmission via multiple paths. In the shown embodiment, the virtual network interface 150 is connected to virtual network interface 250 via an LTE network 310 and via a xDSL network 320. Other types of networks may also be utilized, wherein in such a case the user equipment 100 and the converter 200 are then provided with respective network interfaces adapted for communication via said other types of networks.

In an exemplary embodiment, a QUIC tunnel is established between a first network entity and a second network entity, wherein in the embodiment shown in FIG. 2 the first network entity is the user equipment 100 and the second network entity is the converter 200, and the QUIC tunnel is established between the virtual network interface 150 and the virtual network interface 250. Establishing a QUIC tunnel means to establish a connection using a tunneling protocol on the basis of the QUIC protocol.

TCP is often used as a tunneling protocol. QUIC can similarly be used as a tunneling protocol, allowing tunneling services to maintain the benefits of QUIC, without degrading the performance and security characteristics.

A tunneling protocol is a communications protocol that allows for the transmission of data from one network entity to another network entity through a process called encapsulation. Because the QUIC tunneling involves repackaging the traffic data into a different form, with encryption as standard, due to the use of the QUIC protocol, it can hide the nature of the traffic that is run through a tunnel. A tunneling protocol works by using the data portion of a packet, i.e. the payload, to carry the packets that actually provide the service. Tunneling uses a layered protocol model such as those of the OSI or TCP/IP protocol suite, but usually violates the layering when using the payload to carry a service not normally provided by the network. Typically, the delivery protocol operates at an equal or higher level in the layered model than the payload protocol.

A QUIC tunnel between two multi-path capable entities, such as entities 100 and 200, can typically transport any network traffic from Layer 2 upwards. In the embodiment shown in FIG. 2 the data packets which are encapsulated into QUIC packets exemplary comprise QUIC data packets from application 110, UDP data packets from application 120, IP data packets from application 130 and TCP data packets from application 140.

In an exemplary embodiment, both QUIC tunnel termination points, in the embodiment shown in FIG. 2 virtual network interfaces 150 and 250, employ an MP-QUIC protocol, so that the QUIC tunnel itself is distributed over the multiple paths.

The current design of QUIC does not enable multi-homed or hybrid access devices to efficiently use different paths simultaneously. Therefore, in order to utilize an MP-QUIC protocol within the QUIC tunnel, an exemplary embodiment provides a respective extension of the current QUIC protocol.

Typically a path is defined by a 4-tuple, comprising Source IP Address, Source Port Number, Destination IP Address, and Destination Port Number. QUIC paths are host-specific, i.e., the path from A to B is different from the one from B to A, which enables the use of unidirectional networks such as satellites, unapplicable when using TCP.

Furthermore, QUIC is not bound to a particular 4-tuple during the lifetime of a connection. A QUIC connection is identified by a Connection ID, placed in the public header of each QUIC packet. This enables hosts to continue the connection even if the 4-tuple changes. This ability to shift a connection from one 4-tuple to another is called Connection Migration. A QUIC peer can thus start on a given path, denoted as the initial path, and end on another one. However, the current QUIC design assumes that only one symmetric path is in use for a given connection.

In the following, a possible establishment of a Multipath QUIC connection between a first network entity and a second network entity is exemplary described. A Multipath QUIC connection may start like a regular QUIC connection, wherein a handshake takes place according to the current QUIC design. During this handshake a multipath capability may be negotiated between the network entities, in the embodiment as shown in FIG. 2 between the user equipment 100 and the converter 200 utilizing virtual network interfaces 150 and 250. For this purpose, a respective parameter is transmitted between the network entities which indicates the capability of the respective network entity for multi-path transmission. The parameter may for instance indicate the number of paths which may be simultaneously supported by the respective network entity. In an embodiment, no transmitted parameter or a parameter with a value of zero indicates no support for multi-path transmission and any other parameter value indicates support for multi-path transmission.

An established Multipath QUIC connection comprises at least two paths, wherein each path is associated with a different four-tuple and is identified by a Path ID, wherein the respective Path IDs are negotiated between the network entities. As an extension over the current QUIC design the Path ID is transmitted in all or at least in certain QUIC packets, wherein the Path ID may be placed in the public header of the respective QUIC packets.

Thus, the invention provides for the combination of a QUIC tunnel and the use of a MP-QUIC protocol for data transmission between a first and a second network entity, wherein the first network entity in particular is a user device, such as a hybrid access router or a smartphone having two network interfaces for connecting to respectively different networks, and wherein the second network entity in particular is a server in the core network of a communication provider, such as a hybrid aggregation gateway.

Again referring to FIG. 2, a service using the IP compatible multipath framework as described above, based on QUIC encapsulation in the QUIC tunnel, sends its payload through the virtual network interface 150. The shown exemplary services provided by applications 110, 120, 130 and 140 generate different types of data packets, e.g. IP packet, UDP datagrams, QUIC segments, TCP segments or Ethernet frames. Each of the virtual network interfaces 150 and 250 acts as the entry or exit point of the IP compatible multipath framework, depending on the direction of traffic transmission. After entering the respective one of virtual network interfaces 150 or 250, the payload becomes encapsulated into the QUIC tunnel. In a next step, MP-QUIC takes over transmission control and decides on which path out of a potential bunch of path, the encapsulated payload is sent. On the receiver side, the packets are received by the MP-QUIC stack. When they become released and the MP-QUIC are stripped off, i.e. the encapsulation is removed, the piggybacked payload exits the respective virtual network interface on receiver side ready to be forwarded to the respective one of the original service endpoints 510, 520, 530 or 540 via the Internet 400.

As described above, within the QUIC tunnel various types of data packets may be encapsulated and transmitted as payload, wherein certain types of data packets may be transmitted between the communication endpoints using a reliable transmission, as for instance TCP data packets transmitted between applications 140 and 540.

The Transmission Control Protocol, or short TCP, aims to provide an interface for sending streams of data reliably between two endpoints, wherein data is handed to the TCP system, which ensures the data makes it to the other end in exactly the same form, or the connection will indicate that an error condition exists. To do this, TCP breaks up the data into network packets and adds small amounts of data to each packet. This additional data includes a sequence number that is used to detect packets that are lost or transmitted out of order, and a checksum that allows the errors within packet data to be detected. When either problem occurs, TCP uses automatic repeat request (ARQ) to tell the sender to re-send the lost or damaged packet. In most implementations, TCP will see any error on a connection as a blocking operation, stopping further transfers until the error is resolved or the connection is considered failed. If a single connection is being used to send multiple streams of data, as is the case in the HTTP/2 protocol, all of these streams are blocked although only one of them might have a problem. This phenomenon is called head-of-line blocking.

QUIC aims to be nearly equivalent to a TCP connection but with reduced latency. QUIC uses UDP as its basis, which does not include loss recovery. Instead, each QUIC stream is separately flow controlled and lost data retransmitted at the level of QUIC, not UDP. This means that if an error occurs in one stream, the protocol stack can continue servicing other streams independently. However, head-of-line blocking still occurs with respect to the one stream which has the error.

To ensure no head-of-line blocking by the QUIC tunnel, in case of disturbance, a mechanism is preferably applied within QUIC which relaxes its reliable transmission.

Furthermore, if data packets of a protocol such as TCP, which employs reliable transmission and accordingly performs re-transmissions in case of error and reordering of data packets, are encapsulated within the QUIC tunnel, a conflict may arise, when also within the QUIC tunnel a reliable transmission would be performed with re-transmissions and reordering of piggybacked TCP packets and underlying QUIC packets simultaneously. Such a conflict might lead to significant increase of latency and/or decrease of throughput.

Therefore, in a preferred embodiment of the invention, quick user datagram protocol internet connection packets or QUIC packets are transmitted non-reliably between the first and the second network entities 100 and 200. For this purpose, preferably an information is transmitted from the first network entity to the second network entity indicating non-reliable transmission within the QUIC tunnel, wherein this information may be transmitted in a handshake according to the current QUIC design. In response, the quick user datagram protocol internet connection packets or QUIC packets are transmitted non-reliably, i.e. without re-transmissions in case of packet loss and without re-ordering.

A non-reliable data transmission, preferably for the data transmission within the QUIC tunnel, is another extension of the current QUIC design. For this purpose, preferably a different or an additional frame type may be defined and indicated by a parameter within a QUIC packet.

Greatly differing transmission characteristics of the multiple paths may however lead an amount of scrambling of the encapsulated data packets which might result in problems for communication services which utilize reliable transmission, for instance reliable transmission of TCP data packets. Therefore, in a preferred embodiment, forwarding the extracted data packets from the second network entity, for instance converter 200 to the respective destination network entity, for instance network entity 510, 520, 530 or 540, is performed in an order depending on ordering information, which is comprised in the encapsulated data packets, such as a TCP data packet, and/or in the quick user datagram protocol internet connection packets or QUIC packets.

In other words, a certain reordering is preferably performed, which however typically is not a complete reordering, wherein in particular packet loss is tolerated and accordingly no re-transmissions are performed.

In a preferred embodiment, received data packets are queued in a reorder queue in the second network entity for forwarding, wherein the data packets in the reorder queue are reordered according to a pre-defined reorder criterion, and wherein data packets which are lost in the transmission from the first network entity to the second network entity via the tunnel are skipped in the reordering. Furthermore, mechanisms may the used for the reordering as described in EP 3 531 637 A1.

The congestion control scheme as defined by the current QUIC design is not suitable for data transmission via multiple paths. Therefore this congestion control scheme preferably is not used.

For MP-QUIC data transmission within the QUIC tunnel, the LIA congestion control scheme as specified in RFC 6356 may be utilized, which is also used by Multipath TCP.

In a preferred embodiment, congestion control information may be extracted from the data packets transmitted as payload within the QUIC tunnel in the first and/or in the second network entity, wherein in particular said extracted congestion control information is used for adapting a congestion control of the QUIC tunnel between the first network entity and a second network entity.

In a further preferred embodiment of the invention, a maximum transmission unit of at least one transmission path available for transmitting data from the first network entity to the second network entity is determined and the data size of the quick user datagram protocol internet connection packets is selected depending on the determined maximum transmission unit.

The invention preferably combines three technologies for shaping an IP compatible multipath framework as depicted in FIG. 2, capable of transporting IP packets, UDP datagrams and QUIC segments over multiple paths, wherein said technologies are
QUIC encapsulation using a QUIC tunnel,
employment of Multipath QUIC within the QUIC tunnel, and non-reliable transmission of the payload within the QUIC tunnel.

All of these technologies are extensions and/or modifications of the current QUIC design.

As described above, an additional feature to guarantee efficient processing of the piggybacked payload through the QUIC tunnel might be a re-assembly unit on receiver side to bring the payload in the same or almost identical order as they were originated. The re-assembly unit can be placed within QUIC or MP-QUIC but also as an external entity as long as some ordering information is available.

As an additional feature, a Path Maximum Transfer Unit (PMTU) probing might be employed, when a new path joins the MP-QUIC session, to ensure no mismatch with the virtual network interface Maximum Transfer Unit (VNIF MTU) and to avoid fragmentation. In case the PMTU is lower than the difference of VNIF MTU and the encapsulation overhead, the VNIF MTU preferably is adapted.

As another additional feature to avoid performance degradation by the QUIC tunnel some interaction with a potential inner congestion control of the piggybacked payload may be employed, as described above, wherein congestion control parameters of the piggybacked payload may only be measured for monitoring purposes without performing congestion control of the QUIC tunnel on that basis.

Figure 3:
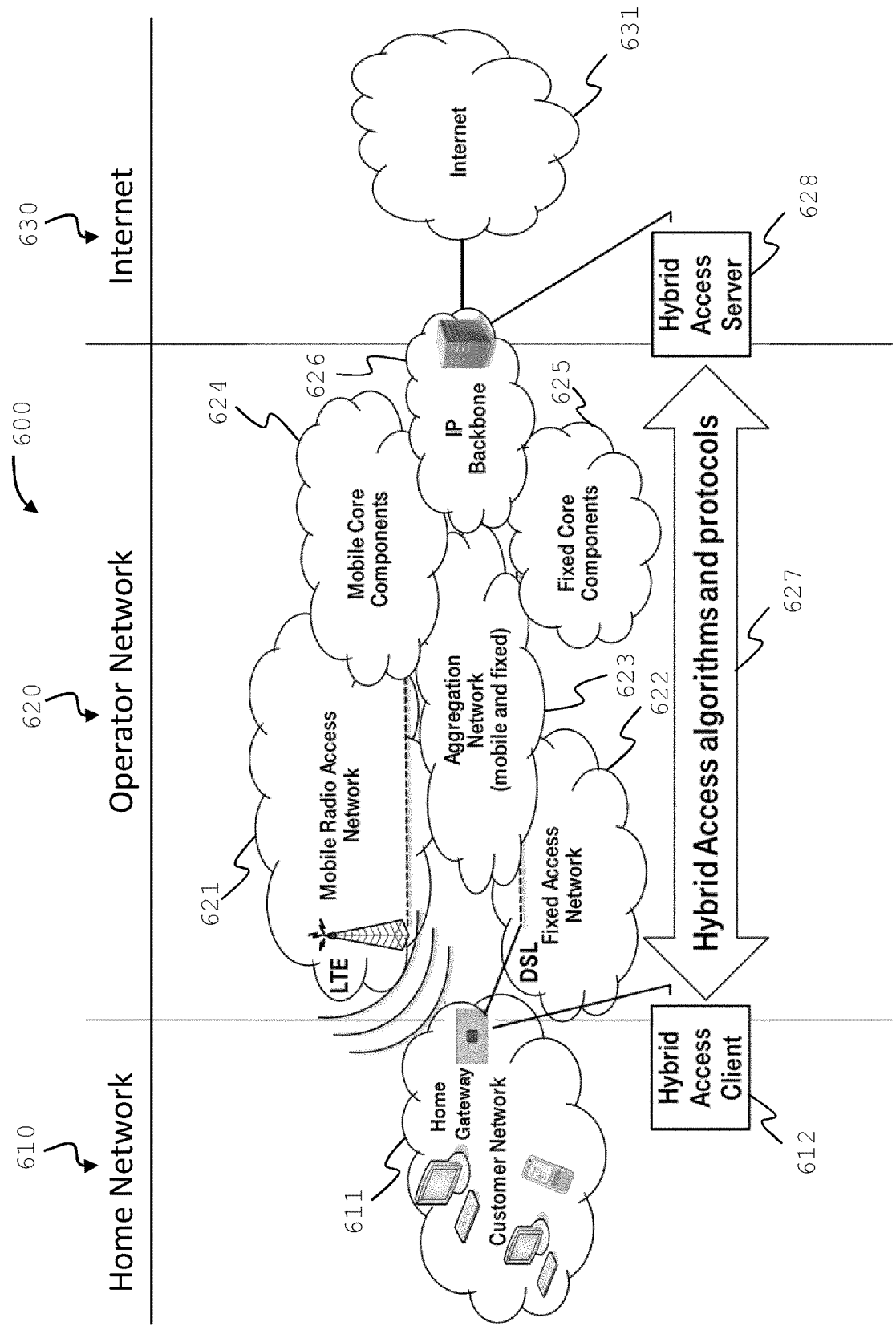
FIG. 3 depicts a schematic view of a reference topology for Hybrid Access.

FIG. 3 shows a reference topology 600 for Hybrid Access (HA). The reference topology 600 illustrates the Home Network zone 610 with Customer Network 611 and Home Gateway with Hybrid Access Client 612, the Integrated Operator Network 620 with a variety of operator networks 621, 622, 623, 624, 625, 626 and the Internet zone 630 with the Internet 631. At the operator networks 621, 622, 623, 624, 625, 626, Hybrid Access algorithms and protocols 627 are implemented to connect the Hybrid Access Client 612 with the Hybrid Access Server 628 for connection with the Internet 631. The reference topology 600 as shown in FIG. 3 is an example of a system in which the invention may be employed, wherein in FIG. 3 the first network entity as described above is the Hybrid Access Client 612 and the second network entity is the Hybrid Access Server 628.

At least some of the preferred aspects are summarized below. In the following, the term "user datagram protocol internet connection packet" refers to a QUIC packet as described above, the format of which is based on the current QUIC design extended and/or modified by the respective extensions and/or modifications provided by the invention as described herein.

According to one aspect, a method for transmitting data packets of at least one communication service from a first network entity to at least one destination network entity is provided, comprising the steps of establishing a quick user datagram protocol internet connection tunnel between the first network entity and a second network entity, transmitting the data packets from the first network entity to the second network entity via said tunnel, wherein the data packets are encapsulated within quick user datagram protocol internet connection packets, and wherein the quick user datagram protocol internet connection packets are transmitted from the first network entity to the second network entity via multiple paths, extracting the data packets from the received quick user datagram protocol internet connection packets in the second network entity, and forwarding the extracted data packets from the second network entity to the respective destination network entity.

In a preferred embodiment of the method, an information is transmitted from the first network entity to the second network entity indicating non-reliable transmission within the quick user datagram protocol internet connection tunnel, wherein in response the quick user datagram protocol internet connection packets are transmitted non-reliably.

Preferably, the data packets and/or the quick user datagram protocol internet connection packets comprise ordering information, wherein forwarding the extracted data packets from the second network entity to the respective destination network entity is performed in an order depending on said ordering information.

Preferably, for forwarding the received data packets are queued in a reorder queue in the second network entity, and wherein the data packets in the reorder queue are reordered according to a pre-defined reorder criterion, and wherein data packets which are lost in the transmission from the first network entity to the second network entity via the tunnel are skipped in the reordering.

The quick user datagram protocol internet connection tunnel preferably is established between a first virtual network interface in the first network entity and a second virtual network interface in the second network entity. Virtual network interfaces are known per se, wherein the use of virtual network interfaces allows for simple routing in the respective network entities.

Preferably, data packets originating from different communication services are encapsulated in the same quick user datagram protocol internet connection packet.

The method preferably comprises the steps of determining a maximum transmission unit of at least one transmission path available for transmitting data packets from the first network entity to the second network entity, and selecting the data size of the quick user datagram protocol internet connection packets depending on the determined maximum transmission unit.

Furthermore, the method preferably comprises the step of extracting congestion control information from the data packets in the first and/or in the second network entity, wherein in particular said extracted congestion control information is used for adapting a congestion control of the quick user datagram protocol internet connection tunnel between the first network entity and a second network entity.

According to another aspect, a network device is provided, which comprises at least two network interfaces, said network device being adapted for multi-path communication using said at least two network interfaces, wherein the network device is further adapted for establishing a quick user datagram protocol internet connection tunnel to a further network device, said further network device being adapted for multi-path communication, wherein the network device is adapted for transmitting data packets to the further network device via said tunnel, said data packets being encapsulated within quick user datagram protocol internet connection packets, wherein the quick user datagram protocol internet connection packets are transmitted via multiple paths, extracting data packets from received quick user datagram protocol internet connection packets, and for forwarding extracted data packets to the respective destination.

The network device preferably is a hybrid customer premises equipment router, a hybrid aggregation gateway or a mobile communication device.

In a further aspect, a communication system is provided, comprising at least two network devices as described above, in particular a combination of a user equipment and a server of a communication provider.

While subject matter of the present disclosure has been illustrated and described in detail in the drawings and foregoing description, such illustration and description are to be considered illustrative or exemplary and not restrictive.

Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for transmitting data packets of at least one communication service from a first network entity to at least one destination network entity, the method comprising:
   establishing a quick user datagram protocol internet connection tunnel between the first network entity and a second network entity;
   transmitting the data packets from the first network entity to the second network entity via the quick user datagram protocol internet connection tunnel, wherein each data packet of the data packets is generated by a respective communication service of the at least one communication service on the basis of a communication protocol which is selected depending on the respective communication service, wherein the data packets are encapsulated within quick user datagram protocol internet connection packets, wherein, in a quick user datagram protocol internet connection packet of the quick user datagram protocol internet connection packets, data packets originating from different communication services are encapsulated, wherein the quick user datagram protocol internet connection packets with the data packets encapsulated therein are transmitted from the first network entity to the second network entity via multiple paths using a multi-path QUIC (MP-QUIC) protocol, and wherein the multiple paths are used simultaneously;
   extracting, at the second network entity, the data packets from the quick user datagram protocol internet connection packets; and
   forwarding the extracted data packets from the second network entity to a respective destination network entity.

2. The method of claim 1, wherein information is transmitted from the first network entity to the second network entity indicating non-reliable transmission within the quick user datagram protocol internet connection tunnel, and wherein the quick user datagram protocol internet connection packets are transmitted non-reliably.

3. The method of claim 2, wherein at least one of the data packets or the quick user datagram protocol internet connection packets comprise ordering information, and wherein forwarding the extracted data packets from the second network entity to the respective destination network entity is performed in an order depending on the ordering information.

4. The method of claim 3, wherein for forwarding, the data packets are queued in a reorder queue in the second network entity, wherein the data packets in the reorder queue are reordered according to a pre-defined reorder criterion, and wherein data packets which are lost in the transmission from the first network entity to the second network entity via the tunnel are skipped in the reordering.

5. The method of claim 1, wherein the quick user datagram protocol internet connection tunnel is established between a first virtual network interface in the first network entity and a second virtual network interface in the second network entity.

6. The method of claim 1, further comprising:
determining a maximum transmission unit of at least one transmission path available for transmitting data packets from the first network entity to the second network entity; and
selecting the data size of the quick user datagram protocol internet connection packets depending on the determined maximum transmission unit.

7. The method of claim 1, further comprising:
extracting congestion control information from the data packets in at least one of the first network entity or the second network entity, wherein the extracted congestion control information is used for adapting a congestion control of the quick user datagram protocol internet connection tunnel between the first network entity and a second network entity.

8. The method of claim 1, wherein for forwarding, the data packets are queued in a reorder queue in the second network entity, wherein the data packets in the reorder queue are reordered according to a pre-defined reorder criterion, and wherein data packets which are lost in the transmission from the first network entity to the second network entity via the tunnel are skipped in the reordering.

9. A communication system, comprising:
a first network device adapted for multi-path communication via at least two network interfaces; and
a second network device adapted for multi-path communication;
wherein the first network device is configured for:
establishing a quick user datagram protocol internet connection tunnel to the second network device; and
transmitting data packets to the second network device via the quick user datagram protocol internet connection tunnel, wherein each data packet of the data packets is generated by a respective communication service of at least one communication service on the basis of a communication protocol which is selected depending on the respective communication service, wherein the data packets are encapsulated within quick user datagram protocol internet connection packets, wherein, in a quick user datagram protocol internet connection packet of the quick user datagram protocol internet connection packets, data packets originating from different communication services are encapsulated, wherein the quick user datagram protocol internet connection packets with the data packets encapsulated therein are transmitted via multiple paths using a multi-path QUIC (MP-QUIC) protocol, and wherein the multiple paths are used simultaneously;

wherein the second network device is configured for:
extracting the data packets from the quick user datagram protocol internet connection packets; and
forwarding the extracted data packets to a respective destination.

10. The communication system of claim 9, wherein the first network device is a hybrid customer premises equipment router, a hybrid aggregation gateway, or a mobile communication device.

11. One or more non-transitory computer-readable mediums having processor-executable instructions stored thereon for transmitting data packets of at least one communication service from a first network entity to at least one destination network entity, wherein the processor-executable instructions, when executed, facilitate:
establishing a quick user datagram protocol internet connection tunnel between the first network entity and a second network entity;
transmitting the data packets from the first network entity to the second network entity via the quick user datagram protocol internet connection tunnel, wherein each data packet of the data packets is generated by a respective communication service of the at least one communication service on the basis of a communication protocol which is selected depending on the respective communication service, wherein the data packets are encapsulated within a quick user datagram protocol internet connection packets, wherein, in a quick user datagram protocol internet connection packet of the quick user datagram protocol internet connection packets, data packets originating from different communication services are encapsulated, wherein the quick user datagram protocol internet connection packets with the data packets encapsulated therein are transmitted from the first network entity to the second network entity via multiple paths using a multi-path QUIC (MP-QUIC) protocol, and wherein the multiple paths are used simultaneously;
extracting the data packets from the quick user datagram protocol internet connection packets in the second network entity; and
forwarding the extracted data packets from the second network entity to a respective destination network entity.

12. A method for transmitting data packets of at least one communication service from a first network entity to at least one destination network entity, the method comprising:
establishing a quick user datagram protocol internet connection tunnel between the first network entity and a second network entity;
transmitting the data packets from the first network entity to the second network entity via the quick user datagram protocol internet connection tunnel, wherein each data packet of the data packets is generated by a respective communication service of the at least one communication service on the basis of a communication protocol which is selected depending on the respective communication service, wherein the data packets are encapsulated within quick user datagram protocol internet connection packets, wherein the quick user datagram protocol internet connection packets with the data packets encapsulated therein are transmitted from the first network entity to the second network entity via multiple paths using a multi-path QUIC (MP-QUIC) protocol, and wherein the multiple paths are used simultaneously;

extracting the data packets from the received quick user datagram protocol internet connection packets in the second network entity; and forwarding the extracted data packets from the second network entity to a respective destination network entity;

wherein information is transmitted from the first network entity to the second network entity indicating non-reliable transmission within the quick user datagram protocol internet connection tunnel, and wherein the quick user datagram protocol internet connection packets are transmitted non-reliably;

wherein at least one of the data packets or the quick user datagram protocol internet connection packets comprise ordering information, and wherein forwarding the extracted data packets from the second network entity to the respective destination network entity is performed in an order depending on the ordering information; and wherein for forwarding, the received data packets are queued in a reorder queue in the second network entity, wherein the data packets in the reorder queue are reordered according to a pre-defined reorder criterion, and wherein data packets which are lost in the transmission from the first network entity to the second network entity via the tunnel are skipped in the reordering.

13. A communication system, comprising:

a first network device adapted for multi-path communication via at least two network interfaces; and a second network device adapted for multi-path communication;

wherein the first network device is configured for:
establishing a quick user datagram protocol internet connection tunnel to the second network device; and
transmitting data packets to the second network device via the quick user datagram protocol internet connection tunnel, wherein each data packet of the data packets is generated by a respective communication service of at least one communication service on the basis of a communication protocol which is selected depending on the respective communication service, wherein the data packets are encapsulated within quick user datagram protocol internet connection packets, wherein the plurality of quick user datagram protocol internet connection packets with the data packets encapsulated therein are transmitted via multiple paths using a multi-path QUIC (MP-QUIC) protocol, and wherein the multiple paths are used simultaneously;

wherein the second network device is configured for:
extracting the data packets from the quick user datagram protocol internet connection packets; and
forwarding the extracted data packets to a respective destination;

wherein the first network entity is further configured for transmitting information to the second network entity indicating non-reliable transmission within the quick user datagram protocol internet connection tunnel, and for transmitting the quick user datagram protocol internet connection packets non-reliably;

wherein at least one of the data packets or the quick user datagram protocol internet connection packets comprise ordering information, and wherein forwarding the extracted data packets from the second network entity to the respective destination network entity is performed in an order depending on the ordering information; and wherein for forwarding, the received data packets are queued in a reorder queue in the second network entity, wherein the data packets in the reorder queue are reordered according to a pre-defined reorder criterion, and wherein data packets which are lost in the transmission from the first network entity to the second network entity via the tunnel are skipped in the reordering.

14. One or more non-transitory computer-readable mediums having processor-executable instructions stored thereon for transmitting data packets of at least one communication service from a first network entity to at least one destination network entity, wherein the processor-executable instructions, when executed, facilitate:

establishing a quick user datagram protocol internet connection tunnel between the first network entity and a second network entity;

transmitting the data packets from the first network entity to the second network entity via the quick user datagram protocol internet connection tunnel, wherein each data packet of the data packets is generated by a respective communication service of the at least one communication service on the basis of a communication protocol which is selected depending on the respective communication service, wherein the data packets are encapsulated within quick user datagram protocol internet connection packets, wherein the quick user datagram protocol internet connection packets with the data packets encapsulated therein are transmitted from the first network entity to the second network entity via multiple paths using a multi-path QUIC (MP-QUIC) protocol, and wherein the multiple paths are used simultaneously;

extracting the data packets from the quick user datagram protocol internet connection packets in the second network entity; and forwarding the extracted data packets from the second network entity to a respective destination network entity;

wherein the processor-executable instructions, when executed, further facilitate: transmitting information from the first network entity to the second network entity indicating non-reliable transmission within the quick user datagram protocol internet connection tunnel, and transmitting the quick user datagram protocol internet connection packets non-reliably;

wherein at least one of the data packets or the quick user datagram protocol internet connection packets comprise ordering information, and wherein forwarding the extracted data packets from the second network entity to the respective destination network entity is performed in an order depending on the ordering information; and wherein for forwarding, the received data packets are queued in a reorder queue in the second network entity, wherein the data packets in the reorder queue are reordered according to a pre-defined reorder criterion, and wherein data packets which are lost in the transmission from the first network entity to the second network entity via the tunnel are skipped in the reordering.

* * * * *